US008712455B2

(12) United States Patent
Gosset et al.

(10) Patent No.: US 8,712,455 B2
(45) Date of Patent: Apr. 29, 2014

(54) PROXIMITY-BASED MOBILE MESSAGE DELIVERY

(75) Inventors: Philip Gosset, Stroud (GB); Richard Harper, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/460,488

(22) Filed: Apr. 30, 2012

(65) Prior Publication Data

US 2012/0276852 A1 Nov. 1, 2012

Related U.S. Application Data

(63) Continuation of application No. 12/465,477, filed on May 13, 2009, now Pat. No. 8,170,591.

(51) Int. Cl.
H04W 4/00 (2009.01)
(52) U.S. Cl.
USPC .......................................... 455/466; 713/153
(58) Field of Classification Search
USPC ................. 455/466, 41.1–41.3; 713/153, 168
See application file for complete search history.

(56) References Cited

U.S. PATENT DOCUMENTS

| 6,898,434 | B2 * | 5/2005 | Pradhan et al. | 455/456.1 |
| 8,126,435 | B2 * | 2/2012 | George | 455/412.2 |
| 2003/0018744 | A1 * | 1/2003 | Johanson et al. | 709/217 |
| 2007/0123166 | A1 * | 5/2007 | Sheynman et al. | 455/41.2 |
| 2008/0207124 | A1 * | 8/2008 | Raisanen et al. | 455/41.2 |
| 2009/0187759 | A1 * | 7/2009 | Marsico | 713/155 |
| 2009/0311992 | A1 * | 12/2009 | Jagetiya | 455/412.1 |

* cited by examiner

Primary Examiner — Phuoc H Doan
(74) Attorney, Agent, or Firm — Pablo Tapia; Jim Ross; Micky Minhas

(57) ABSTRACT

Proximity-based mobile message delivery is described. In an embodiment, a first user stores a message intended for a second user on a first mobile terminal, while the first mobile terminal is located remote from a second mobile terminal of the second user. Subsequent to this, the first mobile terminal detects that it is now in proximity with the second mobile terminal, and this triggers the first mobile terminal to transmit the message to the second mobile terminal. In embodiments, authentication of the second mobile terminal can be performed before transmitting the message. In another embodiment, a mobile terminal comprises a short-range wireless transceiver that can detect that a further mobile terminal is in proximity, and trigger the transmission of a pre-stored message to the further mobile terminal.

20 Claims, 5 Drawing Sheets

PROXIMITY-BASED MOBILE MESSAGE DELIVERY

RELATED APPLICATION

This application is a continuation of, and claims priority to, U.S. patent application Ser. No. 12/465,477, filed on May 13, 2009, the disclosure of which is incorporated by reference herein.

BACKGROUND

There is a class of messaging between persons that can be summarized as entailing 'hand-delivery', in that the person who sends, gives or receives a message wants to be physically present when a message is received. Prior to electronically-mediated communications, this would be satisfied by the persons involved simply delivering and/or receiving the message in question by hand, thus ensuring the interactional aspect.

The importance of this type of messaging cannot be underestimated. Indeed, this importance even shows itself in common law and everyday language. To 'shake hands' over a mutual action is a term that labels both an actual act, a shaking of hands, and a contract that can be, in various ways, legally binding for those whose hands have been shaken. Hand-delivery can also afford less formal benefits. For example, when messages are exchanged by hand, benefit can come from the sender or 'giver' seeing the recipient's reaction to the message.

A feature of electronic messaging systems (such as, for example, email, MMS, SMS, etc.) is that they all assume that promptness and certainty of delivery are the primary and often the only aspects of messaging that are significant for both the sender and receiver. The benefits hand-delivery or the contractual and symbolic value of shaking hands at a point of message exchange, are not provided by such electronic messaging systems.

The embodiments described below are not limited to implementations which solve any or all of the disadvantages of known messaging systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Proximity-based mobile message delivery is described. In an embodiment, a first user stores a message intended for a second user on a first mobile terminal, whilst the first mobile terminal is located remote from a second mobile terminal of the second user. Subsequent to this, the first mobile terminal detects that it is now in proximity with the second mobile terminal, and this triggers the first mobile terminal to transmit the message to the second mobile terminal. In embodiments, authentication of the second mobile terminal can be performed before transmitting the message. In another embodiment, a mobile terminal comprises a short-range wireless transceiver that can detect that a further mobile terminal is in proximity, and trigger the transmission of a pre-stored message to the further mobile terminal.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a mobile messaging system, the system described is provided as an example and not a limitation. As those skilled in the art will appreciate, the present examples are suitable for application in a variety of different types of other communication systems.

Figure 1:
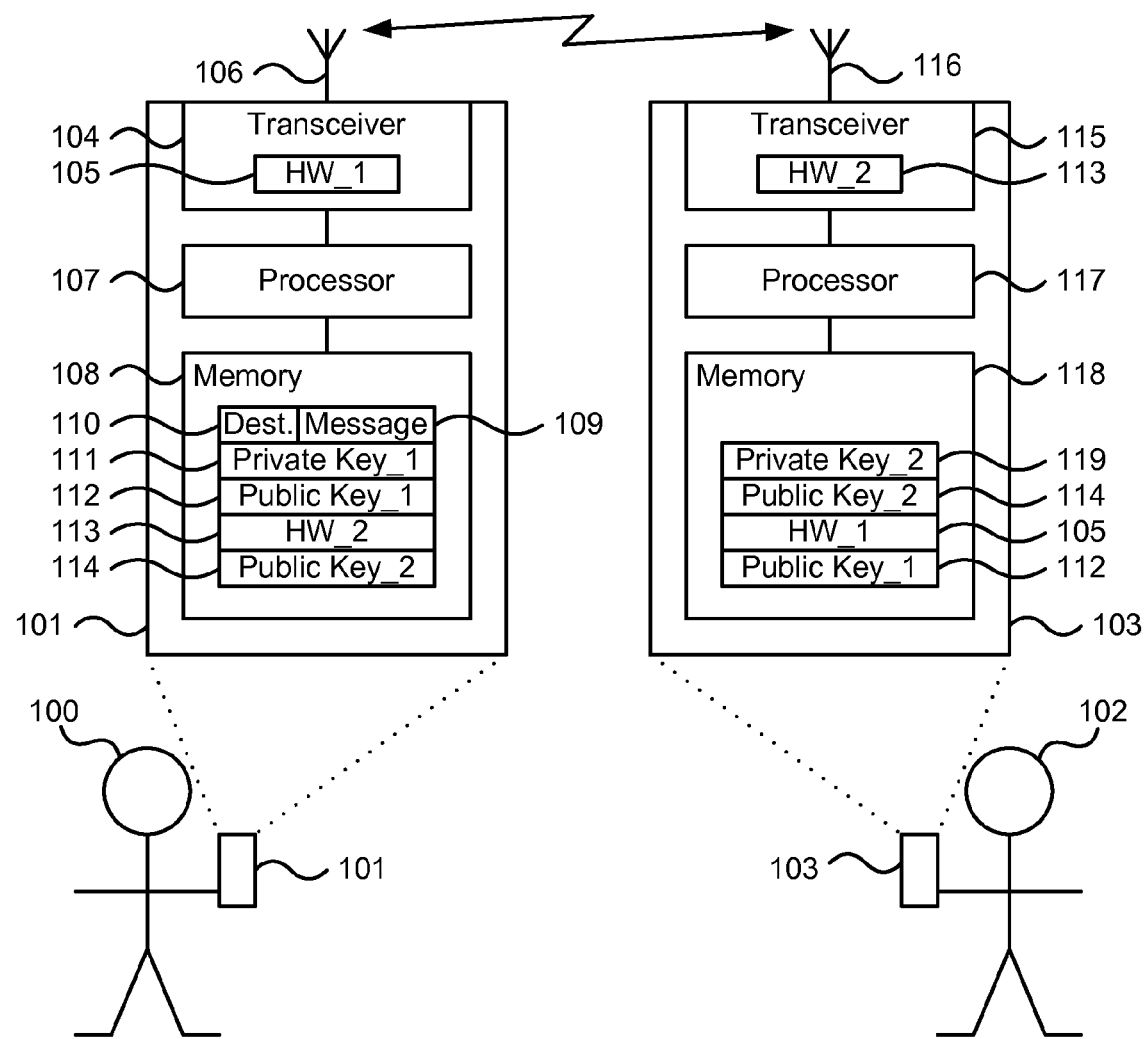
FIG. 1 illustrates a system for proximity-based mobile message delivery.

Reference is first made to FIG. 1, which illustrates system for proximity-based mobile message delivery. The system in FIG. 1 enables a mobile terminal to act as a proxy for a person operating the mobile terminal, such that electronic 'hand-delivery' of a message can be performed. FIG. 1 illustrates a first user 100 having a first mobile terminal 101, and a second user 102 having a second mobile terminal 103. In the example shown in FIG. 1, the first user 100 wants to deliver a message to the second user 102 using the hand-delivery mechanism.

FIG. 1 also shows a detailed view of the mobile terminals. The first mobile terminal 101 comprises a transceiver 104, which is arranged to transmit and receive wireless signals. Preferably, the transceiver 104 is a short-range wireless transceiver, for example of the type used to establish and operate a personal area network (PAN). An example of such a short-range wireless transceiver is a Bluetooth® transceiver. In other examples, different types of short-range wireless transceivers can be used, such as ultra-wideband (UWB), near-field communication (NFC), or ZigBee transceivers, or any other transceiver suitable for wirelessly transmitting and receiving data between mobile terminals over short distances.

Preferably, the transceiver 104 comprises a hardware identity 105 assigned to the transceiver 104 (labeled HW_1 indicating the hardware address for the first mobile terminal 101), such as a media access control (MAC) address. The transceiver 104 sends and receives signals via an antenna 106.

The mobile terminal 101 also comprises a processor 107 connected to the transceiver 104 and arranged to control the transceiver 104 and execute processes responsive to signals from the transceiver 104 and other inputs. The processor 107 is also connected to a memory 108, which is arranged to store data related to the delivery of the message from the first user 100 to the second user 102.

For example, the memory 108 can store a message 109 intended for the second user 102 and an associated destination identifier 110. The destination identifier 110 can be any user-readable identifier of the second user 102, such as, for example, a device name, a user name, a contact name or a telephone number. Other data stored in the memory 109 includes cryptographic keys such as a private key 111 for the first mobile terminal (labeled Private Key_1) a public key 112 for the first mobile terminal (labeled Public Key_1), and data regarding other mobile terminals with which the first mobile terminal 101 has been paired (or previously communicated with), such as a hardware identity 113 for the second mobile terminal 103 (labeled HW_2) and a public key 114 for the second mobile terminal (labeled Public Key_2). Further data regarding other mobile terminals can also be stored, but is not shown for clarity. The data stored in the memory is discussed in more detail hereinafter with reference to FIGS. 2 and 3.

The second mobile terminal 103 has a similar structure to the first mobile terminal 101. The second mobile terminal 103 comprises a transceiver 115 having the hardware identity 113 (HW_2) and connected to an antenna 116 and a processor 117. The processor 117 is connected to a memory 118 storing data including cryptographic keys such as a private key 119 for the second mobile terminal (labeled Private Key_2), the public key 114 for the second mobile terminal (Public Key_2), and data regarding other mobile terminals with which the second mobile terminal 101 has been paired (or previously communicated with), such as the hardware identity 105 for the first mobile terminal 101 (HW_1) and the public key 112 for the first mobile terminal (Public Key_1). Further data regarding other mobile terminals can also be stored, but is not shown for clarity.

In the example of FIG. 1, only the first user 100 has a message 109 to be sent, whereas the second user 102 does not have a message stored on the second mobile terminal 103. In other examples, the second user 102 can also have a message to send (e.g. to the first user 100 or another user).

In the example of FIG. 1, the first mobile terminal 101 and second mobile 103 terminal have previously been "paired", such that information regarding each of the first and second mobile terminals has been exchanged. For example, when first and second mobile terminals are paired, the hardware identity 105 for the first mobile terminal 101 is sent to the second mobile terminal 103 and stored in memory 118, and the hardware identity 113 for the second mobile terminal 103 is sent to the first mobile terminal 101 and stored in memory 108. Additional higher-level information can also be exchanged between the terminals, such as a device name allocated by the user of the terminal, and this can be stored in association with the hardware identity 105. The user can also make further associations, such as associating the paired terminal with a contact in the user's address book.

Further optional information can also be shared between the mobile terminals. For example, when the mobile terminals are paired, the cryptographic public key 112 for the first mobile terminal 101 can be sent to the second mobile terminal 103 and stored in the memory 118, and the cryptographic public key 114 for the second mobile terminal 103 can be sent to the first mobile terminal 101 and stored in the memory 108.

The pairing process can be performed manually by the first and second users when the first and second mobile terminals are in wireless communication range of each other, such that the users request a pairing and each enter a mutually agreed shared secret (e.g. a pass-key) into first and second mobile terminals. Alternatively, the pairing can be performed by physically touching the first and second mobile terminals together, or bringing them to within a few centimeters range (e.g. if near-field communications are used).

Such a pairing process is used for personal area network connections, for example with Bluetooth© transceivers. Note, however, that a pairing process in advance is not essential, and that the information regarding each of the mobile terminals can be obtained from other sources, such as a centralized database.

Figure 2:
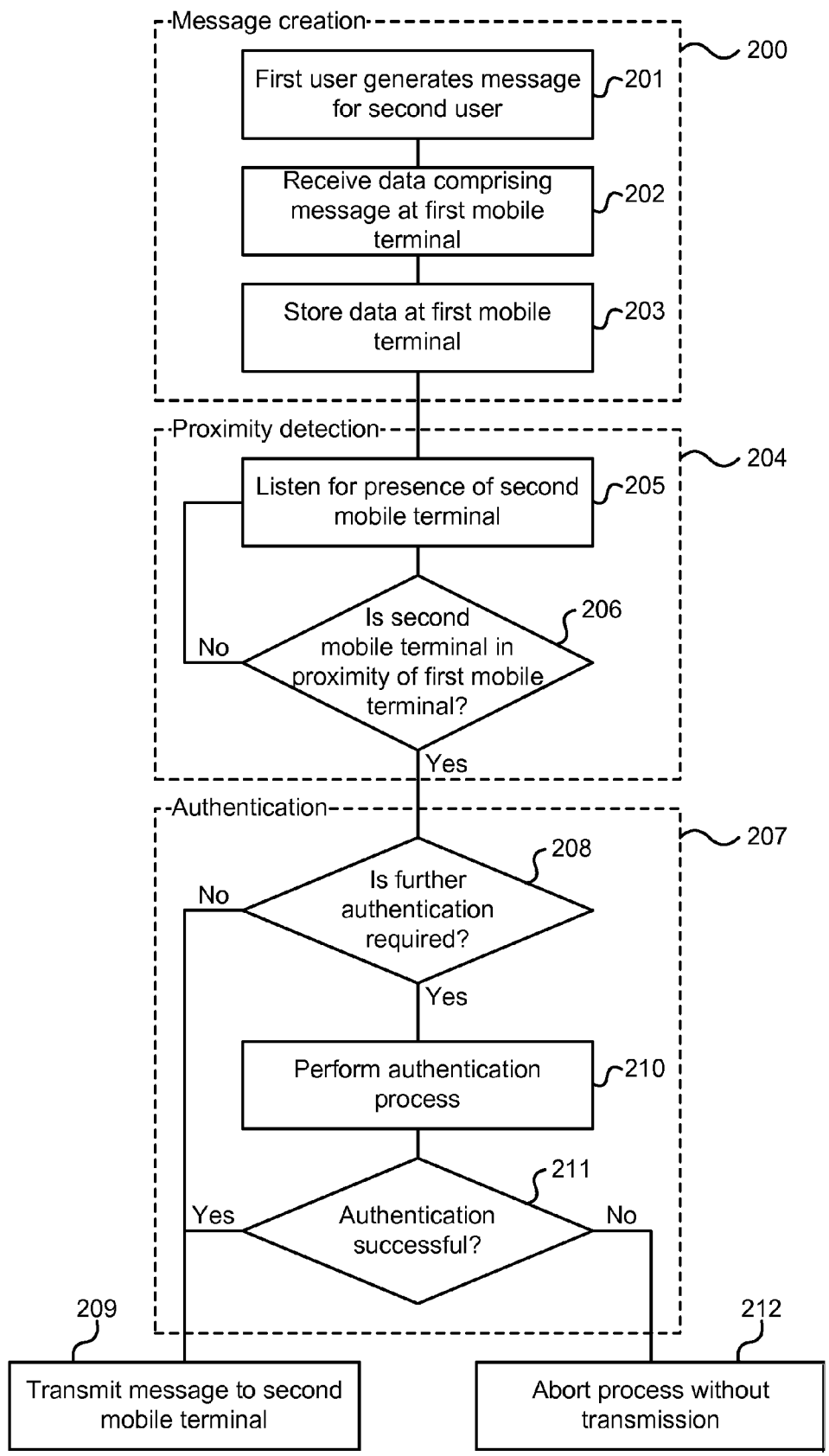
FIG. 2 illustrates a process for delivering a message based on proximity.

Reference is now made to FIG. 2, which illustrates a process for delivering a message based on the proximity between the first and second mobile terminals of FIG. 1. In this example (as with FIG. 1) the first user 100 wishes to send a message to the second user 102.

A first sub-process is a message creation process 200. The message creation process 200 is performed when the first user 100 and the first mobile terminal 101 are located remote from the second user 102 and the second mobile terminal 103. In other words, the message creation process 200 is performed in advance of the first user 100 being in proximity to the second user 102. The term "remote" is taken to mean located sufficiently far away that the first user 100 would not consider themselves to be in the presence of the second user 102.

The first user 100 generates 201 a message intended for delivery to the second user 102. In one example, the generation of the message can be performed using only the first mobile terminal 101, for example by the first user 100 entering a text message using a keypad of the first mobile terminal 101, taking a picture using a camera of the first mobile terminal 101, or recording an audio file using a microphone of the first mobile terminal 101. In an alternative example, the first user can create the message using a further user terminal (such as a personal computer) and transfer the message to the first mobile terminal 101. The message can comprise a document (such as a legal document), one or more images, video, audio, text, or any combination of these types of media.

The first mobile terminal 101 receives 202 data comprising the message as created by the user. If there is a direct generation of the message on the first mobile terminal 101, then the data comprising the message is received via an input device on the first mobile terminal 101, e.g. via the keypad, microphone or camera. Alternatively, if the message is generated on the further user terminal, then the data comprising the message can be received at the first mobile terminal 101 via a communication interface, such as a connection to removable media (e.g. a memory card) or via the transceiver 104.

The data received at the first mobile terminal 101 further comprises a destination identifier for the message (i.e. in this case identifying the second user 102). As stated above with reference to FIG. 1, the destination identifier can be in any suitable form for the first user 100 to identify the second user 102, such as a device name, a username, a contact name or a telephone number. The received data comprising the message is stored 203 in the memory 108 as the message 109 and destination identifier 110, as shown in FIG. 1. The destination identifier 110 is associated to the hardware identifier 113 using the associations that were established when the mobile terminals were paired, or by interrogating a centralized database.

The first mobile terminal 101 then starts a sub-process of detecting 204 whether it is in proximity to the second mobile terminal 103. The first mobile terminal 101 uses the transceiver 104 to listen 205 for the presence of the second mobile terminal 103. This can be achieved in several ways. For example, each transceiver (i.e. transceiver 104 and 115) can be arranged to periodically broadcast its hardware identity, such that other nearby mobile terminals can discover the presence of the broadcasting mobile terminal. Alternatively, the first mobile terminal 101 can be arranged to periodically transmit request messages using the transceiver 104, such that nearby mobile terminals receiving the request message respond with their hardware identity, thereby informing the first mobile terminal 101 of their presence.

When the first mobile terminal 101 is listening, the first mobile terminal 101 determines 206 whether it is in proximity to the second mobile terminal 103. This is achieved by the processor 107 at first mobile terminal 101 comparing any hardware identity received during the listening process with the hardware identity 113 stored and associated with the destination identifier 110 of the message 109.

If the hardware identity 113 is not detected, then the listening continues. If, however, the hardware identity 113 is received, then the first mobile terminal 101 determines that it is located in proximity to the second mobile terminal 103. In this case, the first mobile terminal 101 starts an optional authentication 207 sub-process.

The first mobile terminal 101 determines 208 whether to obtain further authentication of the second mobile terminal 103. For some messages, the hardware identity 113 acts as sufficient authentication for the second mobile terminal 103. However, it is possible for the hardware identity 113 to be spoofed, such that a malicious user can receive messages intended for a different mobile terminal. Therefore, for more sensitive or important messages, additional authentication of the second mobile terminal 103 can be performed.

The decision of whether to obtain further authentication can be based upon a user-defined setting that was applied when the message was created. Alternatively, the type of message being sent to the second mobile terminal 103 can be used to determine the authentication level applied. For example, simple text messages can be sent without further authentication above the hardware identity 113, whereas the sending of a document can imply that further authentication of the second mobile terminal 103 is appropriate.

If further authentication is not appropriate, then the message 109 can be transmitted 209 to the second mobile terminal 103. The transmission of the message 109 can be performed using the transceiver 104 of the first mobile terminal 101 to send the message 109 directly to the transceiver 115 of the second mobile terminal 103. An alternative transmission example is illustrated with reference to FIG. 4 hereinafter.

On transmission of the message, the first mobile terminal 101 has therefore automatically detected that it has come into the presence of another mobile terminal with which it has a message for delivery, and automatically delivered the message. Because the first mobile terminal 101 has determined that it is in proximity to the second mobile terminal 103 before delivering the message, then the benefits of hand-delivery of the message are maintained, such as physical, visual confirmation of the receipt and feedback from the first user 100 seeing the reaction of the second user 102.

In some examples, the first mobile terminal 101 can prompt the first user 100 to confirm that the message 109 is to be sent, prior to the message being transmitted 209. This enables the first user 100 to confirm that he is in the presence of the second user 102, and that the message can be delivered. Whether or not the user is prompted to confirm the transmission of the message can be determined by a user-defined setting applied when the message is created.

Returning to FIG. 2, if the first mobile terminal 101 determines 208 that further authentication of the second mobile terminal 103 is appropriate, then an authentication process 210 is performed. The authentication process is based on a key exchange technique. As mentioned above, when the mobile terminals are paired, not only are the hardware identities stored as proxy for the user, but also an exchange of keys can also be performed. Each mobile terminal has a key pair, and one half of the key pair is exchanged with the other mobile terminal, and stored in association with the hardware identity during pairing.

A simple authentication scheme can then be performed by each of the mobile terminals by transmitting back the key that was provided to it during the pairing process. This key can be matched to the key pair to authenticate the mobile terminal. For example, if the first mobile terminal 101 has a public key 112 (as shown in FIG. 1) and a private key 111, then during pairing the first mobile terminal 101 can provide the public key 112 to the second mobile terminal 103. Subsequently, when preparing to send a message to the second mobile terminal 103, the first mobile terminal 101 can request that the second mobile terminal 103 send back the public key 112 to authenticate the second mobile terminal 103. The first mobile terminal 101 can match the key provided by the second mobile terminal 103 to the public key 111.

Figure 3:
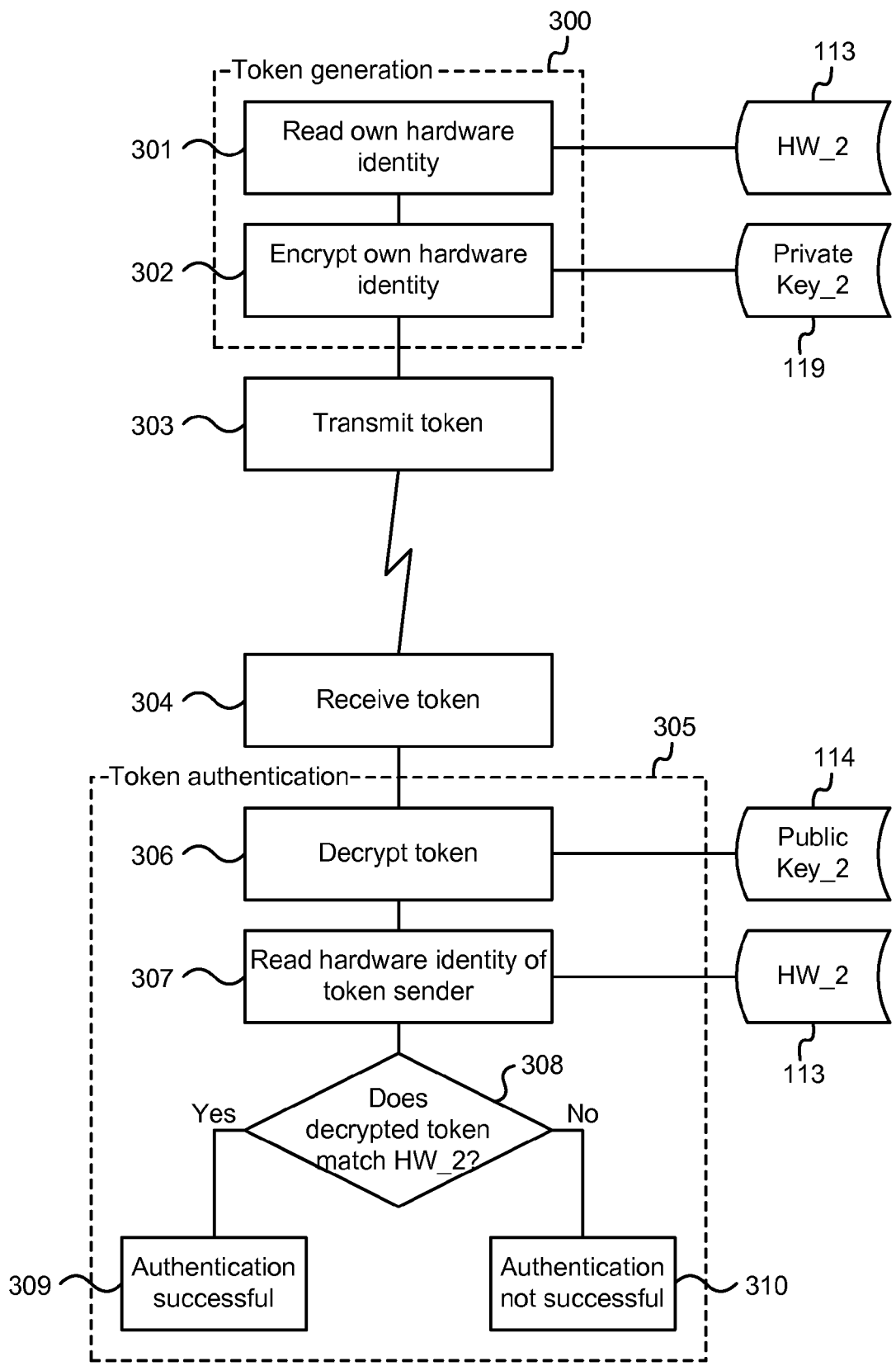
FIG. 3 illustrates an authentication process.

A more secure authentication scheme is shown illustrated in FIG. 3. In this case, the key pair at each mobile terminal comprises a public and private key. The private key is kept secret, and not distributed from the mobile terminal in which it is created. The private key is used to encrypt data. The public key can be freely distributed to other mobile terminals, and can be used to decrypt data encrypted by the private key, but cannot be used to derive the private key. During a pairing operation, the mobile terminals exchange public keys, and these are stored in association with the hardware identities. For example, after pairing, the first mobile terminal 101 obtains the public key 114 and hardware identity 113 of the second mobile terminal 103, and the second mobile terminal 103 obtains the public key 112 and hardware identity 105 of the first mobile terminal 101.

When the second mobile terminal 103 receives request for authentication from the first mobile terminal 101, then second mobile terminal first generates 300 an encrypted authentication token. The encrypted authentication token comprises an encrypted copy of data already known to the first mobile terminal 101. For example, as shown in FIG. 3, the second mobile terminal's own hardware identifier 113 (i.e. from the transceiver 115) can be read 301 by the second mobile terminal 103 and encrypted 302 using the private key 119 of the second mobile terminal 103.

In other examples, different data can be encrypted using the private key 119. For example, the hardware identifier 105 of the first mobile terminal 101 can be encrypted, the public key 112 of the first mobile terminal 101 can be encrypted, or a data string provided in the request for authentication can be encrypted.

The encrypted authentication token is then transmitted 303 from the second mobile terminal 103 and received 304 at the first mobile terminal 101. The first mobile terminal then authenticates 305 the token. This is performed by decrypting 306 the authentication token using the public key 114 of the second mobile terminal 103 (obtained during the pairing operation). Note that the public key 114 of the second mobile terminal 103 can only decrypt data that was encrypted using the (secret) private key 119.

The hardware identity 113 of the second mobile terminal 103 (obtained during the pairing operation) is read 307 from the memory 108 and this is compared 308 to the decrypted authentication token. If the decrypted authentication token matches the hardware identity 113 of the second mobile terminal 103, then the authentication is successful 309. This is because a malicious user spoofing the hardware identity does not know the private key 119, and therefore cannot generate an authentication token that can be decrypted using the public key 114. Alternatively, if the decrypted authentication token does not match the hardware identity 113 of the second mobile terminal 103, then the authentication is not successful 310.

The same process can also be performed by the second mobile terminal 103 to authenticate the first mobile terminal 101 before accepting the message 109. In this case, the first mobile terminal 101 generates an authentication token, which is authenticated by the second mobile terminal 103.

Returning again to FIG. 2, following the authentication process 210, the first mobile terminal 101 determines 211 whether the authentication of the second mobile terminal 103 was successful. If the authentication is not successful, then the message delivery process is aborted 212 without transmitting the message 109. The first user 100 can be prompted to indicate that the message 109 could not be delivered due to insufficient authentication. If, however, the authentication is successful, then the message 109 can be transmitted 209 to the second mobile terminal 103, as described above. As stated above, the first user 100 can optionally be prompted to confirm that the message is to be sent, prior to being transmitted 209.

The first mobile terminal 101 has therefore automatically detected that it has come into a co-proximate location with the second mobile terminal 103 when a message 109 for the second mobile terminal 103 is waiting to be delivered, securely authenticated the second mobile terminal 103, and automatically transmitted the message 109. Because the first mobile terminal 101 has determined that it is in proximity to the second mobile terminal 103 before delivering the message, then the benefits of hand-delivery of the message are maintained, such as physical, visual confirmation of the receipt and feedback from the first user 100 seeing the reaction of the second user 102.

Figure 4:
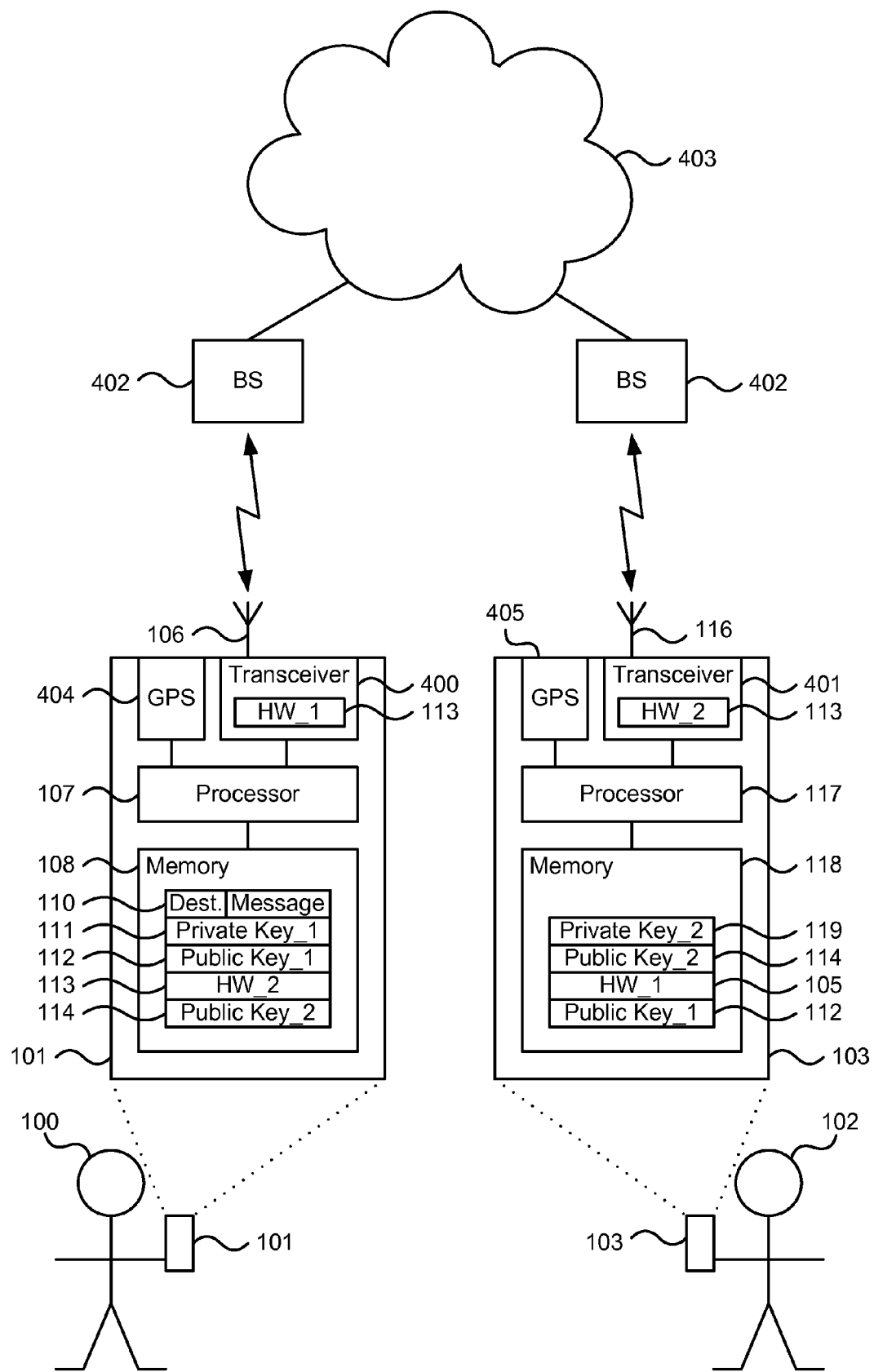
FIG. 4 illustrates an alternative system for proximity-based mobile message delivery.

Reference is now made to FIG. 4, which illustrates an alternative example of a system for proximity-based mobile message delivery. The system shown in FIG. 4 comprises a first user 100 with a first mobile terminal 101, and a second user 102 with a second mobile terminal 103, as described above with reference to FIG. 1. The structure of the mobile terminals is similar to that described above with reference to FIG. 1 in that they both comprise transceivers, processors and memory, and store the same data.

However, in the example of FIG. 4, the transceiver 400 in the first mobile terminal 101 and the transceiver 401 in the second mobile terminal 103 are not short-range wireless transceivers, but are cellular transceivers arranged to communicate with one or more base stations 402. The base stations 402 are connected to a communication network 403, which enables the first and second mobile terminals to communicate with each other. In other examples, the transceivers can be wireless local area network (WLAN) or wireless wide area network (WWAN) transceivers arranged to communicate with each other via a communication network.

Both the first mobile terminal 101 and second mobile terminal 103 further comprise a location sensor, such as a global positioning system (GPS) receiver 404 and 405.

The operation of the system in FIG. 4 is similar to that shown in FIGS. 2 and 3. However, the sub-process of detecting 204 whether a mobile terminal is in proximity is not performed using a short-range wireless transceiver, but is instead performed using the location sensors. When the first mobile terminal 101 has a message to deliver to the second mobile terminal 103, the first mobile terminal can periodically communicate with the second mobile terminal using the transceiver 400 via the base stations 402 and communication network 403, and request information regarding the second mobile terminal's location. The second mobile terminal 103 can determine its location using the location sensors (e.g. GPS receiver 405) and provide the information to the first mobile terminal 101 via the communication network 403. The first mobile terminal 101 can compare the location of the second mobile terminal 103 to its own location determined using GPS receiver 404 to ascertain whether it is currently in proximity to (i.e. within a predefined distance of) the second mobile terminal 103.

Alternatively, if for privacy reasons it is not appropriate to transmit the location of the second mobile terminal 103 to the first mobile terminal 101, then the first mobile terminal 101 can provide its location to the second mobile terminal 103, and the second mobile terminal 103 can respond with an indication of whether it is in proximity to the first mobile terminal 101. The indication can be in the form of a distance separating the two mobile terminals, or simply a true/false response to indicate if they are in proximity.

When it is determined that the first and second mobile terminals are in proximity, then the message is transmitted from the first mobile terminal 101 to the second mobile terminal 103 via the base stations 402 and the communication network 403.

Figure 5:
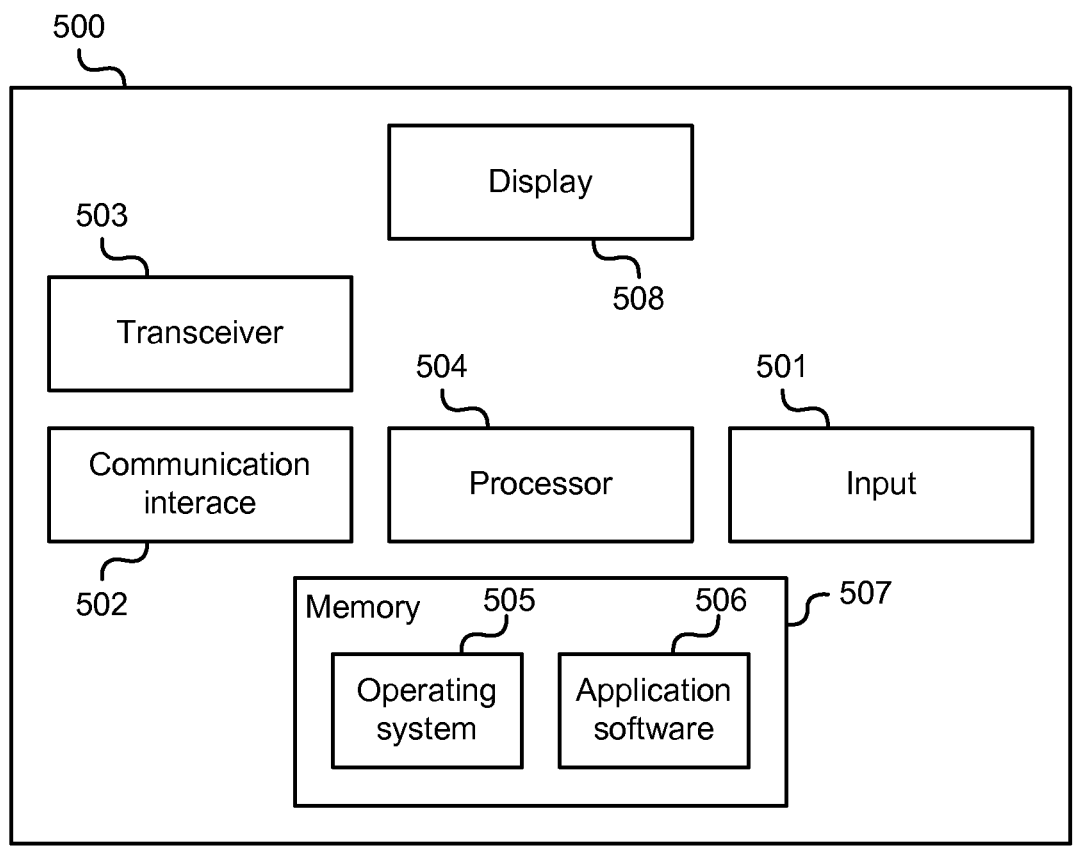
FIG. 5 illustrates an exemplary computing-based device in which embodiments of proximity-based mobile message delivery can be implemented.

FIG. 5 illustrates various components of an exemplary computing-based device 500 which can be implemented as any form of a computing and/or electronic device, and in which embodiments of proximity-based mobile message delivery can be implemented.

The computing-based device 500 comprises one or more inputs 501 which are of any suitable type for receiving user input. The device also comprises communication interface 502 which is suitable for receiving user data, and transceiver 503 which is suitable for transmitting and receiving data wirelessly at the computing-based device 500.

Computing-based device 500 also comprises one or more processors 504 which can be microprocessors, controllers or any other suitable type of processors for processing computing executable instructions to control the operation of the device in order to determine the proximity to other devices and transmit messages accordingly. Platform software comprising an operating system 505 or any other suitable platform software can be provided at the computing-based device 500 to enable application software 506 to be executed on the device.

The computer executable instructions can be provided using any computer-readable media, such as memory 507. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output 508 is also provided such as an audio and/or video output to a display system integral with or in communication with the computing-based device. The display system can provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of transmitting a message from a first mobile terminal to a second mobile terminal to simulate hand delivery of the message from a first user of the first mobile terminal to a second user of the second mobile terminal, the method comprising:
   receiving a user-submitted message at the first mobile terminal, the message intended for personal delivery to the second user;
   storing the message at the first mobile terminal;
pairing the first mobile terminal to the second mobile terminal, pairing including:
   receiving a mutually agreed shared secret, the mutually agreed shared secret being entered at the first mobile terminal by the first user;
   receiving a possible mutually agreed shared secret from the second mobile terminal;
   when the possible mutually agreed shared secret is the mutually agreed shared secret, pairing the first mobile terminal to the second mobile terminal; and
   when the possible mutually agreed shared secret is not the mutually agreed shared secret, rejecting pairing of the first mobile terminal to the second mobile terminal;
   subsequent to storing the message, the first mobile terminal detecting that the second mobile terminal is in proximity to the first mobile terminal, indicating that the first user is in the presence of the second user; and
   transmitting the message from the first mobile terminal to the second mobile terminal.

2. A method as recited in claim 1, wherein the first mobile terminal detecting that the second mobile terminal is in proximity to the first mobile terminal comprises:
   the first mobile terminal sending information to the second mobile terminal identifying a physical location of the first mobile terminal; and
   the first mobile terminal receiving information indicating whether the second mobile terminal is in proximity to the first mobile terminal.

3. A method as recited in claim 2, wherein the information indicating whether the second mobile terminal is in proximity to the first mobile terminal device is an indication of true or false.

4. A method as recited in claim 2, wherein the information indicating whether the second mobile terminal is in proximity to the first mobile terminal is an indication of a distance separating the first mobile terminal device and the second mobile terminal.

5. A method as recited in claim 1, further comprising:
   determining a message type associated with the message;
   when the message type is a first type, transmitting the message including, prior to transmitting the message from the first mobile terminal to the second mobile terminal, the first mobile terminal requesting further authentication from the second mobile terminal; and
   when the message type is a second type, transmitting the message including transmitting without requesting further authentication from the second mobile terminal.

6. A method as recited in claim 1, wherein pairing includes:
   receiving the mutually agreed shared secret via a wireless communication.

7. A method as recited in claim 1, wherein pairing includes detecting that the first mobile terminal and the second mobile terminal are touching.

8. A computer storage medium, the computer storage medium being hardware, storing computer-readable instructions which when executed perform actions to cause one or more processors to transmit a message from a first mobile terminal to a second mobile terminal to simulate hand delivery of the message from a first user of the first mobile terminal to a second user of the second mobile terminal, the actions comprising:

receiving a user-submitted message at the first mobile terminal, the message intended for personal delivery to the second user;

storing the message at the first mobile terminal;

pairing the first mobile terminal to the second mobile terminal, pairing including:

receiving a mutually agreed shared secret, the mutually agreed shared secret being entered at the first mobile terminal by the first user;

receiving a possible mutually agreed shared secret from the second mobile terminal;

when the possible mutually agreed shared secret is the mutually agreed shared secret, pairing the first mobile terminal to the second mobile terminal; and when the possible mutually agreed shared secret is not the mutually agreed shared secret, rejecting pairing of the first mobile terminal to the second mobile terminal;

subsequent to storing the message, the first mobile terminal detecting that the second mobile terminal is in proximity to the first mobile terminal, indicating that the first user is in the presence of the second user; and transmitting the message from the first mobile terminal to the second mobile terminal.

9. A computer storage medium as recited in claim 8, wherein the first mobile terminal detecting that the second mobile terminal is in proximity to the first mobile terminal comprises:

the first mobile terminal sending information to the second mobile terminal identifying a physical location of the first mobile terminal; and the first mobile terminal receiving information indicating whether the second mobile terminal is in proximity to the first mobile terminal.

10. A computer storage medium as recited in claim 9, wherein the information indicating whether the second mobile terminal is in proximity to the first mobile terminal device is an indication of true or false.

11. A computer storage medium as recited in claim 9, wherein the information indicating whether the second mobile terminal is in proximity to the first mobile terminal is an indication of a distance separating the first mobile terminal device and the second mobile terminal.

12. A computer storage medium as recited in claim 8, the actions further comprising:

determining a message type associated with the message;

when the message type is a first type, transmitting the message including, prior to transmitting the message from the first mobile terminal to the second mobile terminal, the first mobile terminal requesting further authentication from the second mobile terminal; and when the message type is a second type, transmitting the message including transmitting without requesting further authentication from the second mobile terminal.

13. A computer storage medium as recited in claim 8, wherein pairing includes:

receiving the mutually agreed shared secret via a wireless communication.

14. A computer storage medium as recited in claim 8, wherein pairing includes detecting that the first mobile terminal and the second mobile terminal are touching.

15. A system for transmitting a message from a first mobile terminal to a second mobile terminal to simulate hand delivery of the message from a first user of the first mobile terminal to a second user of the second mobile terminal, the system comprising:

one or more processors configured to:

receive a user-submitted message at the first mobile terminal, the message intended for personal delivery to the second user;

store the message at the first mobile terminal;

pair the first mobile terminal to the second mobile terminal, the one or more processors being configured to pair the first mobile terminal to the second mobile terminal by:

receiving a mutually agreed shared secret, the mutually agreed shared secret being entered at the first mobile terminal by the first user;

receiving a possible mutually agreed shared secret from the second mobile terminal;

when the possible mutually agreed shared secret is the mutually agreed shared secret, pairing the first mobile terminal to the second mobile terminal; and when the possible mutually agreed shared secret is not the mutually agreed shared secret, rejecting pairing of the first mobile terminal to the second mobile terminal;

subsequent to storing the message, detect that the second mobile terminal is in proximity to the first mobile terminal, indicating that the first user is in the presence of the second user; and transmit the message from the first mobile terminal to the second mobile terminal.

16. A system as recited in claim 15, wherein the one or more processors are configured to detect that the second mobile terminal is in proximity to the first mobile terminal by:

sending information to the second mobile terminal identifying a physical location of the first mobile terminal; and receiving information indicating whether the second mobile terminal is in proximity to the first mobile terminal.

17. A system as recited in claim 16, wherein the information indicating whether the second mobile terminal is in proximity to the first mobile terminal device is an indication of true or false.

18. A system as recited in claim 16, wherein the information indicating whether the second mobile terminal is in proximity to the first mobile terminal is an indication of a distance separating the first mobile terminal device and the second mobile terminal.

19. A system as recited in claim 15, the one or more processors being further configured to:

determine a message type associated with the message;

when the message type is a first type, prior to transmitting the message from the first mobile terminal to the second mobile terminal, request further authentication from the second mobile terminal; and when the message type is a second type, transmit without requesting further authentication from the second mobile terminal.

20. A system as recited in claim 15, wherein the one or more processors are configured to pair the first mobile terminal to the second mobile terminal by:

receiving the mutually agreed shared secret via a wireless connection.

* * * * *